United States Patent
Yang et al.

(10) Patent No.: US 10,252,255 B2
(45) Date of Patent: Apr. 9, 2019

(54) METHOD FOR PREPARING NOBLE METAL HYDROGENATION CATALYST, NOBLE METAL HYDROGENATION CATALYST AND USE THEREOF

(71) Applicant: PetroChina Company Limited, Beijing (CN)

(72) Inventors: Xiaodong Yang, Daqing (CN); Chunmei Yu, Daqing (CN); Yanfeng Liu, Daqing (CN); Sheng Hu, Daqing (CN); Zhihua Zhang, Daqing (CN); Famin Sun, Daqing (CN); Wencheng Zhang, Daqing (CN); Jintao Guo, Daqing (CN); Wenyong Liu, Daqing (CN); Xinmiao Wang, Daqing (CN); Shanbin Gao, Daqing (CN); Bin Xie, Daqing (CN); Jinxian Jiang, Daqing (CN); Yuhe Yang, Daqing (CN); Rui Li, Daqing (CN); Guojia Zhang, Daqing (CN); Lili Jiang, Daqing (CN); Tan Zhao, Daqing (CN); Dongqing Wang, Daqing (CN); Jingying Zhao, Daqing (CN); Quanguo Zhang, Daqing (CN); Ruifeng Li, Daqing (CN); Shengbo Sun, Daqing (CN); Hong Li, Daqing (CN); Cheng Tang, Daqing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 632 days.

(21) Appl. No.: 14/964,348

(22) Filed: Dec. 9, 2015

(65) Prior Publication Data
US 2016/0167029 A1    Jun. 16, 2016

(30) Foreign Application Priority Data
Dec. 10, 2014    (CN) .......................... 2014 1 0758726

(51) Int. Cl.
*B01J 35/02* (2006.01)
*B01J 29/74* (2006.01)
(Continued)

(52) U.S. Cl.
CPC ......... *B01J 35/008* (2013.01); *B01J 29/7446* (2013.01); *B01J 29/80* (2013.01);
(Continued)

(58) Field of Classification Search
CPC ................ B01J 2523/00; B01J 2523/31; B01J 2523/41; B01J 2523/48; B01J 2523/824;
(Continued)

(56) References Cited

U.S. PATENT DOCUMENTS 2,898,289 A * 8/1959 Kimberlin, Jr. .......... B01J 23/40
                                                        208/138
3,869,522 A    3/1975 Van der Eijk
(Continued)

FOREIGN PATENT DOCUMENTS

CN    1362490 A    8/2002
CN    1370814 A    9/2002
(Continued)

OTHER PUBLICATIONS

Nan et al.; "Deactivation of Pd/Al$_2$O$_3$ catalyst for selective hydrogenation of full-range reformate gasoline;" Industrial Catalysis, vol. 15, No. 1, Jan. 31, 2007, pp. 813. (Abstract provided).
(Continued)

*Primary Examiner* — Renee Robinson
*Assistant Examiner* — Derek N Mueller
(74) *Attorney, Agent, or Firm* — Hamilton, Brook, Smith & Reynolds, P.C.

(57) ABSTRACT

Disclosed are a method for preparing a noble metal hydrogenation catalyst comprising preparing a carrier from a molecular sieve having a 10-member ring structure and/or
(Continued)

an amorphous porous material; preparing a noble metal impregnation solution; and preparing noble metal impregnation solutions in a concentration gradient ranging from 0.05 to 5.0 wt % with deionized water, and sequentially impregnating the carrier with the impregnation solutions from low to high concentrations during the carrier impregnation process, or preparing a noble metal impregnation solution at a low concentration ranging from 0.05 to 0.5 wt % and impregnating the carrier by gradually increasing the concentration of the noble metal impregnation solution to 2.0 to 5.0 wt % in the impregnation process, followed by homogenization, drying, and calcination, as well as a noble metal hydrogenation catalyst, use thereof, and a method for preparing lubricant base oil.

13 Claims, 1 Drawing Sheet

(51) Int. Cl.
  B01J 35/00 (2006.01)
  B01J 29/80 (2006.01)
  B01J 37/02 (2006.01)
  B01J 37/08 (2006.01)
  C10G 65/00 (2006.01)
  C10M 101/02 (2006.01)

(52) U.S. Cl.
  CPC ....... B01J 37/0205 (2013.01); B01J 37/0213 (2013.01); B01J 37/0236 (2013.01); B01J 37/08 (2013.01); C10G 65/00 (2013.01); C10M 101/025 (2013.01); B01J 29/74 (2013.01); B01J 29/7476 (2013.01); B01J 29/7484 (2013.01); B01J 29/7492 (2013.01); B01J 35/026 (2013.01); B01J 2229/20 (2013.01); B01J 2229/42 (2013.01); B01J 2523/00 (2013.01); C10M 2203/1006 (2013.01); C10M 2203/1025 (2013.01); C10N 2230/40 (2013.01); C10N 2230/43 (2013.01); C10N 2260/02 (2013.01); C10N 2270/00 (2013.01)

(58) Field of Classification Search
  CPC .. B01J 2523/828; B01J 2523/47; B01J 23/40; B01J 23/44; B01J 35/0073; B01J 35/1019; B01J 35/1038; B01J 35/1042; B01J 37/0009; B01J 37/0203; B01J 37/0205; B01J 37/0213; B01J 37/08; B01J 37/28; C10G 45/52
  See application file for complete search history.

(56) References Cited

U.S. PATENT DOCUMENTS

| 3,943,053 | A | 3/1976 | Kovach et al. |
| 4,399,058 | A | 8/1983 | Stanulonis et al. |
| 4,849,093 | A | 7/1989 | Vauk et al. |
| 5,308,814 | A | 5/1994 | Kukes et al. |
| 5,993,644 | A | 11/1999 | Xiao et al. |
| 7,737,074 | B2 | 6/2010 | Smegal et al. |
| 2004/0082461 | A1 | 4/2004 | Remans et al. |
| 2005/0085646 | A1 | 4/2005 | Muller et al. |
| 2016/0167017 | A1 | 6/2016 | Yang et al. |

FOREIGN PATENT DOCUMENTS

| CN | 101927169 A1 | 12/2010 |
| CN | 101927176 A | 12/2010 |
| CN | 101927176 A | 12/2010 |
| CN | 101927196 A | 12/2010 |
| CN | 102641739 A | 8/2012 |
| EP | 0 204 314 A2 | 12/1986 |
| EP | 0 204 314 B1 | 11/1990 |
| RU | 2 250 133 C2 | 4/2005 |
| RU | 2 343 976 C2 | 1/2009 |

OTHER PUBLICATIONS

Nan et al.; "Study on Nonuniform Distribution of Active Components in Supported Pd-Pt Bimetallic Catalysts I: Effect of different preparation parameters on the non-uniform distribution of active ingredients;" Chemical Engineering of Oil & Gas, vol. 37, No. 5, Dec. 31, 2008, pp. 271-275. (Abstract provided—Machine translation).

* cited by examiner

METHOD FOR PREPARING NOBLE METAL HYDROGENATION CATALYST, NOBLE METAL HYDROGENATION CATALYST AND USE THEREOF

RELATED APPLICATION

This application claims priority under 35 U.S.C. § 119 or 365 to China, Application No. 201410758726.1, filed Dec. 10, 2014. The entire teachings of the above application are incorporated herein by reference.

FIELD OF TECHNOLOGY

The present invention relates to a noble metal hydrogenation catalyst and preparation method thereof as well as its use in preparation of lubricant base oil.

BACKGROUND OF THE INVENTION

With increase year by year in demand for premium lubricant base oil all over the world and increasing requirements on environmental protection, there appears a great need for high quality base oils having type II and type III high viscosity index. Despite of being the means primarily used for production of premium lubricant base oil at present, hydrogenation technology is now facing tough challenges, and there is an urgent need to develop a hydrogenation technology with more superior performance, and higher activity and stability in order to adapt to the trend of processing worse raw materials.

The essence of hydrogenation technology lies in highly efficient hydrogenation catalysts to be developed. In the field of development of hydrogenation catalysts for lubricant base oil, highlighted issues include insufficient hydrogenation isomerization performance of the catalyst, poor aromatic ring-opening capability, and low yield of base oil while maintaining the viscosity index and pour point of the base oil. These issues are primarily due to inadequate utilization of active centers of noble metals in the catalyst and undesirable distribution of noble metals therein, which in turn leads to low activity of the catalyst. Moreover, in order to improve catalyst activity, noble metal contents are increased, resulting in a high cost for manufacture of the catalyst.

Currently, it is conventional in the industry to prepare an impregnation solution having a fixed concentration of noble metals and impregnate a catalyst carrier by saturated or oversaturated impregnation, followed by drying and calcination to prepare a catalyst. U.S. Pat. No. 4,399,058 introduces a method for preparing a hydrogenation catalyst in which group VIB and group VIII metal salts are mixed with aqueous ammonia followed by further addition of aqueous ammonia to adjust pH to a certain value so as to prepare a noble metal solution at a fixed concentration, and an inorganic oxide carrier is saturated impregnated with the metal solution, dried and calcinated to provide a hydrogenation catalyst.

By impregnating a carrier using incipient saturated impregnation, the resultant noble metal components usually distribute evenly on the carrier. For catalytic reactions that primarily take place on the catalyst surface, there will be tremendous waste and loss of noble metals, in particular, consequently inevitable increase in the cost for manufacture of the catalyst for expensive noble metals (Pt, Pd, Ru, Rh, Re, Ir, and etc.). Little has been reported on preparation method of hydrogenation catalysts having an uneven distribution of noble metals, in particular a distribution in an increasing gradient.

European patent EP 0 204 314 describes a method for preparing a hydrogenation catalyst with an uneven distribution of noble metal components. In the preparation process, a stepwise multiple-impregnation approach is employed to load the noble metal components, i.e., a carrier is impregnated with a solution of active component A, and then washed, dried, and calcinated; subsequently, it is impregnated with an impregnation solution of active component B, and washed, dried, and calcinated again. By using a preparation method including stepwise washing, drying and calcinating, the noble metal content within the catalyst particle is made higher than the metal content on its surface, and the life span of such catalyst with an uneven distribution is extended as compared to a catalyst with an even distribution. However, due to the complexity of this preparation method and loss of noble metals in the preparation process, the cost for preparation of such a catalyst is rather high.

Chinese patent CN 101927176A discloses a hydrogenation catalyst with a distribution of concentrations of active metals and acid auxiliary in an increasing gradient. In the preparation of the catalyst, inorganic compounds selected from $Al_2O_3$ or $Al_2O_3$ comprising $SiO_2$, $TiO_2$ and/or $ZrO_2$ are chosen as a carrier, but the introduction of molecular sieves as the carrier is not described. As for the choice of the metals in the catalyst, nonmetal catalysts are used as active components, and molybdenum and/or tungsten and/or nickel and/or cobalt compounds are used as active metals. In the related field of technology, active metal loading in such types of catalysts is known in the art to normally have a mass faction of 10 wt % or more, and it is easy to achieve a distribution of active metals in such a high content in the catalyst in an increasing gradient. However, when noble metals are used as active components, the content thereof in the catalyst is rather low due to the high cost of the noble metals, and it is thus technically difficult to achieve a distribution of concentration of the noble metal components in a low content in the catalyst in an increasing gradient, which is not described in any related patents. Also, this patent is applicable in the preparation and use of catalysts in the field of non-noble metal hydrogenation, and such catalysts are mainly applied in the field of residual oil hydrogenation; whereas, hydrogenation catalysts used in the field of lubricant base oil production are noble metal catalysts. Therefore, the catalyst disclosed in this patent is not applicable in the field of lubricant base oil.

SUMMARY OF THE INVENTION

An objective of the present invention is to provide a method for preparing a noble metal hydrogenation catalyst, a noble metal hydrogenation catalyst, use of the noble metal hydrogenation catalyst, as well as a preparation method of lubricant base oil, so as to overcome the defect of noble metal components distributing uniformly on the carrier in the prior art.

To achieve the above objective, the present invention provides a method for preparing a noble metal hydrogenation catalyst comprising:

step 1: preparing a carrier from a molecular sieve having a 10-member ring structure and/or an amorphous porous material, wherein the molecular sieve having a 10-member ring structure is selected from one or more of ZSM-5, SAPO-11, EU-1, ITQ-13, ZSM-22, MCM-22, NU-87, and ZSM-23, the mass fraction of the amorphous porous material contained in the carrier is 10 to 90 wt %, and the mass faction of the molecular sieve having a 10-member ring structure contained therein is 5 to 80 wt %;

step 2: preparing a noble metal impregnation solution from one or more of compounds of noble metals Pt, Pd, Ru, Rh, Re, and Ir and deionized water or an acid solution, wherein the concentration of the noble metal impregnation solution is 0.1 to 5.0 wt %, and preparing a hydrogenation catalyst having a noble metal mass fraction of 0.05 to 2.0 wt % by incipient impregnation; and step 3: preparing noble metal impregnation solutions in a concentration gradient ranging from 0.05 to 5.0 wt % with deionized water, and sequentially impregnating the carrier with the impregnation solutions from low to high concentrations during the carrier impregnation process, or preparing a noble metal impregnation solution at a low concentration ranging from 0.05 to 0.5 wt % and impregnating the carrier by gradually increasing the concentration of the noble metal impregnation solution to 2.0 to 5.0 wt % in the impregnation process, followed by homogenization for 10 minutes to 3 hours, drying at 90 to 140° C. for 3 to 10 h, and calcination at 450 to 600° C. for 3 to 10 h.

Herein, the amorphous porous material is selected from one or more of $Al_2O_3$, $SiO_2$, $Al_2O_3$—$SiO_2$, $TiO_2$, $Al_2O_3$—$TiO_2$, $ZrO_2$, or $Al_2O_3$—$ZrO_2$.

Herein, the noble metal is selected from one or two of Pt, Pd, Ru, and Re compounds, and the mass fraction of the noble metal contained in the catalyst is preferably 0.1 to 1.0 wt %.

Herein, in step 2, the mass fraction of the noble metal in the prepared hydrogenation catalyst is preferably 0.2 to 0.6 wt %.

Herein, in step 3, the concentration of the noble metal component in the prepared catalyst particle increases gradually from the center of the particle to the outer surface thereof, the ratio of the metal content at the circumcenter of the particle to the metal content on the circumcircle surface of the particle is 0.1 to 0.6, and the ratio of the metal content at 0.5 R to the metal content on the outer surface is 0.4 to 0.8, where the circumradius is R with the circumcenter of the cross section of the catalyst particle taken as the starting point.

Herein, in step 3, the step of gradually increasing the concentration of the noble metal impregnation solution is dropping a noble metal impregnation solution having a concentration higher than that of the noble metal impregnation solution at a low concentration into the noble metal impregnation solution at a low concentration at a constant speed during the impregnation process.

Herein, the concentration of the noble metal component in the noble metal hydrogenation catalyst increases gradually from the center of the particle to the outer surface thereof, the ratio of the metal content at the circumcenter of the particle to the metal content on the circumcircle surface of the particle is 0.1 to 0.6, and the ratio of the metal content at 0.5 R to the metal content on the outer surface is 0.4 to 0.8, where the circumradius is R with the circumcenter of the cross section of the catalyst particle taken as the starting point.

Herein, the noble metal is selected from one or two of Pt, Pd, Ru, and Re compounds, and the mass fraction of the noble metal contained in the catalyst is preferably 0.05 to 2.0 wt %.

Herein, the mass fraction of the noble metal contained in the catalyst is 0.1 to 1.0 wt %, preferably 0.2 to 0.6wt %.

Further, to achieve the above objective, the present invention provides a method for preparing lubricant base oil by using the noble metal hydrogenation catalyst prepared by the method described above as a catalyst.

In the method for preparing lubricant base oil, a waxy hydrocarbon raw material is contacted with the noble metal hydrogenation catalyst on a catalyst bed under a hydrogen atmosphere and the product flows outward to obtain a lubricant base oil having a low pour point, high viscosity index and high yield.

In the method for preparing lubricant base oil, the waxy hydrocarbon raw material is selected from hydrocracked tail oil having a boiling point higher than 350° C., or hydrogenated vacuum gas oil, or slack wax, or ointment.

In the method for preparing lubricant base oil, the waxy hydrocarbon raw material has a sulfur content of no more than 100 μg/g and a nitrogen content of no more than 100 μg/g.

In the method for preparing lubricant base oil, the waxy hydrocarbon raw material has a sulfur content of no more than 50 μg/g and a nitrogen content of no more than 50 μg/g.

Further, the present invention provides use of the noble metal hydrogenation catalyst prepared by the above method for preparing a noble metal hydrogenation catalyst in preparation of lubricant base oil.

For the noble metal hydrogenation catalyst and the preparation method thereof according to the present invention, the noble metal components distribute in an increasing gradient inside the catalyst particle. As compared with the prior art, such catalyst has good hydrogenation activity and high stability, and is more significant in the field of lubricant base oil production. Also, such catalyst shows excellent hydroisomerization performance as well as superior aromatics saturation property, and produces lubricant base oil having high viscosity index, low pour point and high base oil yield. Moreover, due to the special gradient distribution of noble metal components in the catalyst, loading of the catalyst is decreased, thereby reducing the manufacturing cost of the catalyst. Further, the preparation process is advantageous in its simple operation, and thus shows great promise in application.

DETAILED DESCRIPTION OF EMBODIMENTS

Figure 1:
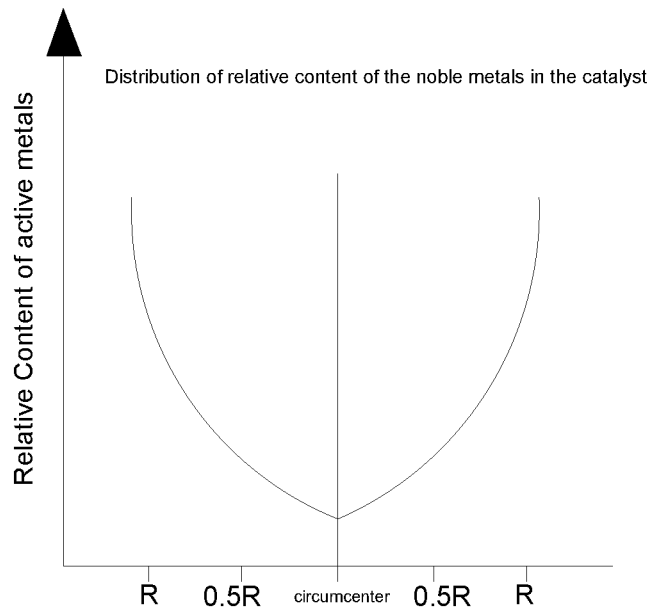
FIG. 1 is a plot of noble metal distribution from the center to the surface of the catalyst particle according to the present invention.
Figure 2:
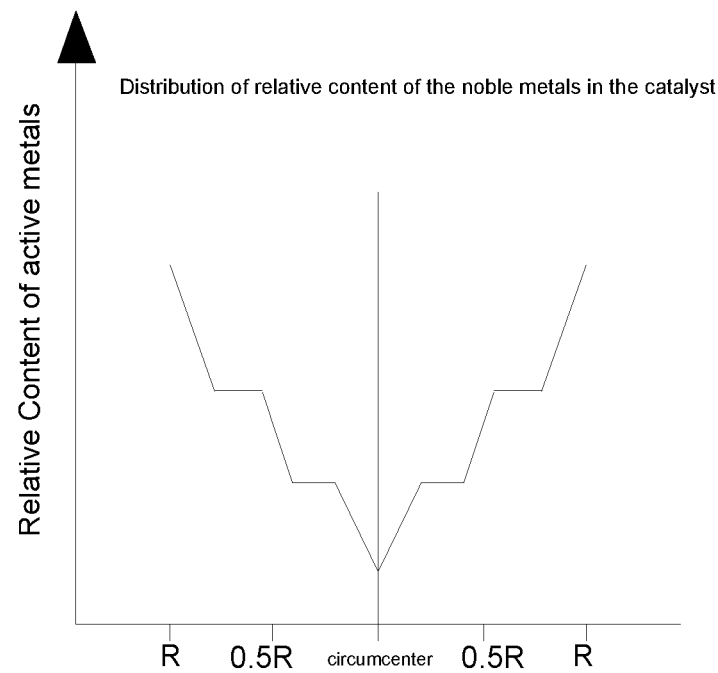
FIG. 2 is a plot of noble metal distribution from the center to the surface of the catalyst particle according to the present invention.

The present invention provides a method for preparing a noble metal hydrogenation catalyst comprising:

step 1: preparing a carrier from a molecular sieve having a 10-member ring structure and/or an amorphous porous material, wherein the molecular sieve having a 10-member ring structure is selected from one or more of ZSM-5, SAPO-11, EU-1, ITQ-13, ZSM-22, MCM-22, NU-87, and ZSM-23, the mass fraction of the inorganic porous material contained in the carrier is 10 to 90 wt %, and the mass faction of the molecular sieve contained therein is 5 to 80 wt %;

step 2: preparing a noble metal impregnation solution from one or more of compounds of noble metals Pt, Pd, Ru, Rh, Re, and Ir and deionized water or an acid solution, wherein the concentration of the noble metal impregnation solution is 0.1 to 5.0 wt %, and preparing a hydrogenation catalyst having a noble metal mass fraction of 0.05 to 2.0 wt % by incipient impregnation; and step 3: preparing noble metal impregnation solutions in a concentration gradient ranging from 0.05 to 5.0 wt % with deionized water, and sequentially impregnating the carrier with the impregnation solutions from low to high concentrations during the carrier impregnation process, or preparing a noble metal impregnation solution at a low concentration ranging from 0.05 to 0.5 wt % and impregnating the carrier by gradually increasing the concentration of the noble metal impregnation solution to 2.0 to 5.0 wt % in the impregnation process, followed by homogenization for 10 minutes to 3 hours, drying at 90 to 140° C. for 3 to 10 h, and calcination at 450 to 600° C. for 3 to 10 h.

Herein, the inorganic porous material is selected from one or more of $Al_2O_3$, $SiO_2$, $Al_2O_3$—$SiO_2$, $TiO_2$, $Al_2O_3$—$TiO_2$, $ZrO_2$, or $Al_2O_3$—$ZrO_2$.

Herein, the noble metal is selected from one or two of Pt, Pd, Ru, and Re compounds, and the mass fraction of the noble metal contained in the catalyst is preferably 0.1 to 1.0 wt %.

Herein, in step 2, the mass fraction of the noble metal in the prepared hydrogenation catalyst is preferably 0.2 to 0.6 wt %.

Herein, in step 3, the concentration of the noble metal component in the prepared catalyst particle increases gradually from the center of the particle to the outer surface thereof, the ratio of the metal content at the circumcenter of the particle to the metal content on the circumcircle surface of the particle is 0.1 to 0.6, and the ratio of the metal content at 0.5 R to the metal content on the outer surface is 0.4 to 0.8, where the circumradius is R with the circumcenter of the cross section of the catalyst particle taken as the starting point.

Herein, in step 3, the step of gradually increasing the concentration of the noble metal impregnation solution is dropping a noble metal impregnation solution having a concentration higher than that of the noble metal impregnation solution at a low concentration into the noble metal impregnation solution at a low concentration at a constant speed during the impregnation process.

Herein, the concentration of the noble metal component in the noble metal hydrogenation catalyst increases gradually from the center of the particle to the outer surface thereof, the ratio of the metal content at the circumcenter of the particle to the metal content on the circumcircle surface of the particle is 0.1 to 0.6, and the ratio of the metal content at 0.5 R to the metal content on the outer surface is 0.4 to 0.8, where the circumradius is R with the circumcenter of the cross section of the catalyst particle taken as the starting point.

Herein, the noble metal is selected from one or two of Pt, Pd, Ru, and Re compounds, and the mass fraction of the noble metal contained in the catalyst is preferably 0.05 to 2.0 wt %.

Herein, the mass fraction of the noble metal contained in the catalyst is 0.1 to 1.0 wt %, preferably 0.2 to 0.6wt %.

Further, the present invention provides a method for preparing lubricant base oil by using the noble metal hydrogenation catalyst prepared by the method described above as a catalyst.

In the method for preparing lubricant base oil, a waxy hydrocarbon raw material is contacted with the noble metal hydrogenation catalyst on a catalyst bed under a hydrogen atmosphere and the product flows outward to obtain a lubricant base oil having a low pour point, high viscosity index and high yield.

In the method for preparing lubricant base oil, the waxy hydrocarbon raw material is selected from hydrocracked tail oil having a boiling point higher than 350° C., or hydrogenated vacuum gas oil, or slack wax, or an ointment.

In the method for preparing lubricant base oil, the waxy hydrocarbon raw material has a sulfur content of no more than 100 µg/g and a nitrogen content of no more than 100 µg/g.

In the method for preparing lubricant base oil, the waxy hydrocarbon raw material has a sulfur content of no more than 50 µg/g and a nitrogen content of no more than 50 µg/g.

Further, the present invention provides use of the noble metal hydrogenation catalyst prepared by the above method for preparing a noble metal hydrogenation catalyst in preparation of lubricant base oil.

Specifically, the process of preparation of the noble metal hydrogenation catalyst according to the present invention includes:

step 1: preparing a carrier from a molecular sieve having a 10-member ring structure and/or an amorphous porous material, wherein the molecular sieve having a 10-member ring structure is selected from one or more of ZSM-5, SAPO-11, EU-1, ITQ-13, ZSM-22, MCM-22, NU-87, and ZSM-23, the mass fraction of the inorganic porous material contained in the carrier is 10 to 90 wt %, and the mass faction of the molecular sieve contained therein is 5 to 80 wt %;

step 2: preparing a noble metal impregnation solution from one or more of compounds of noble metals Pt, Pd, Ru, Rh, Re, and Ir and deionized water or an acid solution, wherein the concentration of the noble metal impregnation solution is 0.1 to 5.0 wt %, and preparing a hydrogenation catalyst having a noble metal mass fraction of 0.05 to 2.0 wt % by incipient impregnation; and step 3: preparing noble metal impregnation solutions in a concentration gradient ranging from 0.05 to 5.0 wt % with deionized water, and sequentially impregnating the carrier with the impregnation solutions from low to high concentrations during the carrier impregnation process, or preparing a noble metal impregnation solution at a low concentration ranging from 0.05 to 0.5 wt % and impregnating the carrier by gradually increasing the concentration of the noble metal impregnation solution to 2.0 to 5.0 wt % in the impregnation process, followed by homogenization for 10 minutes to 3 hours, drying at 90 to 140° C. for 3 to 10 h, and calcination at 450 to 600° C. for 3 to 10 h; wherein the step of gradually increasing the concentration of the noble metal impregnation solution is dropping a noble metal impregnation solution having a concentration higher than that of the noble metal impregnation solution at a low concentration into the noble metal impregnation solution at a low concentration at a constant speed during the impregnation process.

During the preparation of the catalyst, the amorphous porous material is selected from one or more of $Al_2O_3$, $SiO_2$, $Al_2O_3$—$SiO_2$, $TiO_2$, $Al_2O_3$—$TiO_2$, $ZrO_2$, or $Al_2O_3$—$ZrO_2$.

The concentration of the noble metal component in the prepared noble metal hydrogenation catalyst increases gradually from the center of the particle to the outer surface thereof, the ratio of the metal content at the circumcenter of the particle to the metal content on the circumcircle surface of the particle is 0.1 to 0.6, and the ratio of the metal content at 0.5 R to the metal content on the outer surface is 0.4 to 0.8, where the circumradius is R with the circumcenter of the cross section of the catalyst particle taken as the starting point.

During the preparation of the noble metal hydrogenation catalyst, the noble metal selected in the present invention is one or more noble metal compounds of Pt, Pd, Ru, Rh, Re, and Ir, preferably one or two of Pt, Pd, Ru, and Re compounds, and the mass fraction of the noble metal contained in the catalyst is preferably 0.1 to 1.0 wt %, more preferably 0.2 to 0.6wt %.

For the noble metal hydrogenation catalyst prepared according to the present invention, the forming method may be extruding, tableting, or dripping, preferably extruding. The appearance of the catalyst may be a spherical shape, a bar shape (cylindrical, three-leaf clover, or four-leaf clover), a Rasching ring, and preferably a bar shape.

The noble metal hydrogenation catalyst prepared according to the present invention is primarily used in the manufacture of high quality lubricant base oil. The method for preparing lubricant base oil is to contact a waxy hydrocarbon raw material contact with the noble metal hydrogenation catalyst on a catalyst bed under a hydrogen atmosphere, and allow the product to flow outward to give a lubricant base oil having a low pour point, high viscosity index and high yield. Herein, the waxy hydrocarbon raw material is selected from hydrocracked tail oil having a boiling point higher than 350° C., or hydrogenated vacuum gas oil, or slack wax, or an ointment. Moreover, the waxy hydrocarbon raw material has a sulfur content of no more than 100 μg/g, preferably no more than 50 μg/g, and a nitrogen content of no more than 100 μg/g, preferably no more than 50 μg/g.

EXAMPLE 1

A catalyst was prepared by incipient impregnation. Inorganic porous materials comprising 45 wt % of $Al_2O_3$, 20 wt % of $Al_2O_3$—$SiO_2$, 10 wt % of $SiO_2$, and 20 wt % $TiO_2$ in a carrier were mechanically kneaded with 5 wt % of EU-1 molecular sieve into a carrier with a water absorption of 0.60 ml/g.

200 g of the carrier was weighed and sprayed and impregnated with 50 ml of an impregnation solution containing $PtCl_2$ at a concentration of 0.05 wt %. During the spray impregnation, 70 ml of an impregnation solution containing 0.16 wt % $PtCl_2$ in diluted hydrochloric acid was dropped into the previous impregnation solution at a constant speed over 30 minutes. The catalyst was homogenized in the spray impregnation apparatus for 10 minutes, dried at 90° C. for 10 hours, and then calcinated at 600° C. for 3 hours to afford catalyst A-1, wherein the mass fraction of Pt contained in the prepared catalyst A-1 was 0.05% (on catalyst mass basis).

EXAMPLE 2

A catalyst was prepared by incipient impregnation. Inorganic porous materials comprising 20 wt % of $Al_2O_3$, 20 wt % of $Al_2O_3$—$ZrO_2$, 10 wt % of $TiO_2$, and 10 wt % $Al_2O_3$—$TiO_2$ in a carrier were mechanically kneaded with 40 wt % of ITQ-13 and ZSM-23 molecular sieves into a carrier with a water absorption of 0.7 ml/g.

200 g of the carrier was weighed and sprayed and impregnated with 50 ml of an impregnation solution containing $PtCl_2$ and $PdCl_2$ at a concentration of 0.2 wt %. During the spray impregnation, 90 ml of an impregnation solution containing 0.7 wt % $PtCl_2$ and $PdCl_2$ in diluted hydrochloric acid was dropped into the previous impregnation solution at a constant speed over 30 minutes. The catalyst was homogenized in the spray impregnation apparatus for 3 hours, dried at 140° C. for 3 hours, and then calcinated at 450° C. for 10 hours to afford catalyst A-2, wherein the mass fraction of Pt and Pd contained in the prepared catalyst A-2 was 0.2% (on catalyst mass basis).

EXAMPLE 3

A catalyst was prepared by incipient impregnation. Inorganic porous materials comprising 10 wt % of $Al_2O_3$—$SiO_2$ and 10 wt % $ZrO_2$ in a carrier were mechanically kneaded with 40 wt % of MCM-22 and 40 wt % of ZSM-23 molecular sieves into a carrier with a water absorption of 0.75 ml/g.

200 g of the carrier was weighed and sprayed and impregnated with 50 ml of an impregnation solution containing $PtCl_2$ and $PdCl_2$ at a concentration of 0.4 wt %. During the spray impregnation, 100 ml of an impregnation solution containing 1.6 wt % $PtCl_2$ and $PdCl_2$ in diluted hydrochloric acid was dropped into the previous impregnation solution at a constant speed over 30 minutes. The catalyst was homogenized in the spray impregnation apparatus for 2 hours, dried at 100° C. for 6 hours, and then calcinated at 550° C. for 6 hours to afford catalyst A-3, wherein the mass fraction of Pt and Pd contained in the prepared catalyst A-3 was 0.6% (on catalyst mass basis).

EXAMPLE 4

A catalyst was prepared by incipient impregnation. Inorganic porous materials comprising 10 wt % of $Al_2O_3$, 10 wt % of $Al_2O_3$—$SiO_2$, and 10 wt % $Al_2O_3$—$ZrO_2$ in a carrier were mechanically kneaded with 30 wt % of ZSM-22 and 40 wt% of NU-87 molecular sieves into a carrier with a water absorption of 0.65 ml/g.

200 g of the carrier was weighed and sprayed and impregnated with 30 ml of an impregnation solution containing $PtCl_2$ and $PdCl_2$ at a concentration of 0.3 wt %. During the spray impregnation, 100 ml of an impregnation solution containing 1.7 wt % $PtCl_2$ and $PdCl_2$ in diluted hydrochloric acid was dropped into the previous impregnation solution at a constant speed over 30 minutes. The catalyst was homogenized in the spray impregnation apparatus for 1 hour, dried at 100° C. for 6 hours, and then calcinated at 550° C. for 6 hours to afford catalyst A-4, wherein the mass fraction of Pt and Pd contained in the prepared catalyst A-4 was 0.6% (on catalyst mass basis).

EXAMPLE 5

Catalyst A-5 was prepared with the same steps as in Example 4 except that impregnation solutions at different concentrations were used during the spray impregnation where 40 ml of an impregnation solution containing $PtCl_2$ and $PdCl_2$ at a concentration of 1.0 wt % was firstly sprayed and impregnated, and 90 ml of an impregnation solution containing 3.0 wt % $PtCl_2$ and $PdCl_2$ in diluted hydrochloric acid was dropped into the previous impregnation solution at a constant speed. In the prepared catalyst A-5, the mass fraction of Pt and Pd was 1.0% (on catalyst mass basis).

EXAMPLE 6

Catalyst A-6 was prepared with the same steps as in Example 5 except that impregnation solutions at different concentrations were used during the spray impregnation where 20 ml of an impregnation solution containing $PtCl_2$ and $PdCl_2$ at a concentration of 1.5 wt % was firstly sprayed and impregnated, and 110 ml of an impregnation solution containing 5.0 wt % $PtCl_2$ and $PdCl_2$ in diluted hydrochloric acid was dropped into the previous impregnation solution at a constant speed. In the prepared catalyst A-6, the mass fraction of Pt and Pd was 2.0% (on catalyst mass basis).

COMPARATIVE EXAMPLE 1

Catalyst B-1 was prepared with the same steps as in Example 2 except that 200 g $Al_2O_3$ inorganic material was kneaded into a carrier having a water absorption of 0.80 ml/g, and the carrier was sprayed and impregnated with 160 ml of an impregnation solution containing $PtCl_2$ and $PdCl_2$ at a concentration of 1.1 wt %. In the prepared catalyst B-1, the mass fraction of Pt and Pd was 0.6% (on catalyst mass basis).

COMPARATIVE EXAMPLE 2

Catalyst B-2 was prepared with the same steps as in Example 2 except that 200 g of the carrier was weighed and sprayed and impregnated once with 140 ml of an impregnation solution containing $PtCl_2$ and $PdCl_2$ at a concentration of 0.4 wt %. In the prepared catalyst B-2, the mass fraction of Pt and Pd was 0.2% (on catalyst mass basis).

COMPARATIVE EXAMPLE 3

Catalyst B-3 was prepared with the same steps as in Example 4 except that 200 g of the carrier was sprayed and impregnated once with 130 ml of an impregnation solution containing $PtCl_2$ and $PdCl_2$ at a concentration of 1.4 wt %. In the prepared catalyst B-3, the mass fraction of Pt and Pd was 0.6% (on catalyst mass basis).

EXAMPLE 7

Nobel metal contents and noble metal relative distribution in catalysts A-1, A-2, A-3, A-4, A-5, A-6, B-1, B-2, and B-3 were characterized by ICP and EDS characterization means.

TABLE 1

Results of physical properties of the catalysts

| Catalyst No. | Total content of Pt and Pd, μg/g | Noble metal relative distribution (molar ratio) | |
|---|---|---|---|
| | | m(center*)/m(outer surface*) | m(0.5 R*)/m(outer surface*) |
| A-1 | 485 | 0.11 | 0.48 |
| A-2 | 2009 | 0.31 | 0.54 |
| A-3 | 5991 | 0.17 | 0.42 |
| A-4 | 6011 | 0.38 | 0.67 |
| A-5 | 10032 | 0.41 | 0.74 |
| A-6 | 19988 | 0.59 | 0.80 |
| B-1 | 6017 | 0.94 | 0.97 |
| B-2 | 2003 | 0.92 | 0.98 |
| B-3 | 6007 | 0.93 | 0.97 |

Note:
center* is the circumcenter of the cross section of a catalyst particle; R is the cicumradius of the cross section of a catalyst particle, with the circumcenter of the cross section of the catalyst particle as the starting point; outer surface* is the circumcircle surface of the cross section of a catalyst particle.

As seen in Table 1, although catalysts A-1, A-2, A-3, A-4, A-5, and A-6 comprised a low content of noble metal active components, the noble metals showed a trend of their relative distribution in the catalyst increasing in a gradient from inside of the catalyst particle to the outer surface thereof, that is, the ratio of the metal relative content at the circumcenter of the particle to the metal relative content on the circumcircle surface of the particle is 0.1 to 0.6, and the ratio of the metal content at 0.5 R to the metal content on the outer surface is 0.4 to 0.8; whereas, for catalysts B-1, B-2 and B-3 in the Comparative Examples, the noble metals showed a uniform distribution from inside to outside of the catalyst particle.

EXAMPLE 8

Actual assessment of raw material hydrogenation was conducted using A-2, A-4, B-2, and B-3 as exemplary catalysts.

Hydrogenation assessment reaction was carried out on a 100 ml hydrogenation stationary bed, and the raw material oil for assessment was hydrogenated vacuum gas oil. The properties of raw material were shown in Table 2.

TABLE 2

Properties of raw material oil

| | |
|---|---|
| Density (20° C.), g/ml | 0.8669 |
| Distillation range | |
| HK, ° C. | 404 |
| 50%, ° C. | 513 |
| KK, ° C. | 557 |
| Sulfur, μg/g | 37 |
| Nitrogen, μg/g | 29 |
| Viscosity (100° C.), $mm^2/s$ | 11.6 |
| Viscosity index | 52 |
| Aromatics content, wt % | 30.8 |
| Condensation point, ° C. | 51 |
| Pour point, ° C. | 27 |

Operating conditions for the assessment were shown in Table 3.

TABLE 3

Operating conditions for the assessment

| | |
|---|---|
| Temperature, ° C. | 375 |
| Pressure, MPa | 12 |
| Liquid hourly mass space velocity, $h^{-1}$ | 0.85 |
| Hydrogen/oil volume ratio | 600 |

Assessment results after the catalysts had operated for 200 hours were shown in Table 4.

TABLE 4

Assessment results

| Analyzed items | Analysis results | | | |
|---|---|---|---|---|
| | A-2 | A-4 | B-2 | B-3 |
| Sulfur, μg/g | 0.7 | <0.1 | 4.9 | 1.4 |
| Nitrogen, μg/g | 0.3 | <0.1 | 2.4 | 0.7 |
| Viscosity, $mm^2/s$ | 10.4 | 10.2 | 9.6 | 9.3 |
| Viscosity index | 121 | 132 | 104 | 115 |
| Condensation point, ° C. | −18 | −24 | −12 | −15 |
| Pour point, ° C. | −15 | −21 | −9 | −12 |
| Aromatics content, wt % | 1.2 | <1 | 4.5 | 3.1 |
| Total yield of base oil, wt % | 90.6 | 89.1 | 87.3 | 86.2 |

As seen from the assessment results in Table 4, the hydrogenation catalyst having noble metal components distributed in an increasing gradient prepared according to the method of the present invention exhibited superior refining performance, aromatics saturation performance, hydroisomerization performance, performance in decreasing pour point of base oil, as well as total yield of base oil over the hydrogenation catalyst having a uniform distribution of active components prepared by a conventional method, and showed great promise in application in the production of high quality lubricant base oil.

The noble metal catalyst prepared in the present invention is primarily used in the production of high quality lubricant base oil. The method according to the present invention is advantageous in that a distribution of noble metals in an increasing gradient in the catalyst (i.e., metal content increasing in a gradient from the inside to the outside of the catalyst particle) is achieved by impregnating the catalyst with noble metal compounds in a low concentration content, and thus an ideal distribution of noble metal compounds in a low content in the catalyst is realized and active centers in the noble metals are efficiently utilized. The catalyst prepared according to the present invention has high activity and good stability, and particularly, the catalyst prepared in the present invention shows a significant effect in the field of heavy oil processing and premium lubricant base oil production, having advantages of superior hydroisomerization performance, excellent aromatics saturation performance, as well as producing lubricant base oil with high viscosity index, low pour point and high yield of base oil. The utilization of noble metals in the noble metal hydrogenation catalyst prepared according to the present invention is improved, and thereby the loading of noble metals in the catalyst may be effectively decreased, and the manufacturing cost is greatly lowered. The catalyst is remarkably effective in heavy oil processing and production of premium lubricant base oil and thus promising in application.

The noble metal hydrogenation catalyst of the present invention and the preparation method thereof are applicable in the manufacture of aromatics saturation catalysts, reforming hydrogenation catalysts, PAO hydrogenation catalysts, diesel hydrogenation catalysts, and hydroisomerization catalysts, and are particularly applicable in the manufacture of noble metal hydrogenation catalysts for heavy oil processing and production of premium lubricant base oil. The present invention achieves prominent effects in practice and shows great promise in application.

It is obvious that there are numerous other embodiments for the present invention, and various alteration and modification can be made by persons skilled in the art according to the present invention without departing from the spirit and scope of the present invention, but the alteration and modification should fall within the scope of the present invention defined in the claims.

What is claimed is:

1. A method for preparing a noble metal hydrogenation catalyst, characterized in that said method comprises:
    step 1: preparing a carrier from a molecular sieve having a 10-member ring structure and an amorphous porous material, wherein the molecular sieve having a 10-member ring structure is selected from one or more of ZSM-5, SAPO-11, EU-1, ITQ-13, ZSM-22, MCM-22, NU-87, and ZSM-23, the mass fraction of the amorphous porous material contained in the carrier is 10 to 90 wt %, and the mass faction of the molecular sieve having a 10-member ring structure contained therein is 5 to 80 wt %;
    step 2: preparing a noble metal impregnation solution from one or more of compounds of noble metals Pt, Pd, Ru, Rh, Re, and Ir and deionized water or an acid solution, wherein the concentration of the noble metal impregnation solution is in a concentration gradient ranging from 0.05 to 5.0 wt %; and
    step 3: preparing a hydrogenation catalyst having a noble metal mass fraction of 0.05 to 2.0 wt % by incipient impregnation:
    sequentially impregnating the carrier with the impregnation solutions from low to high concentrations during the carrier impregnation process, or impregnating the carrier with the noble metal impregnation solution at a low concentration ranging from 0.05 to 0.5 wt % and gradually increasing the concentration of the noble metal impregnation solution to 2.0 to 5.0 wt % in the impregnation process, followed by homogenization for 10 minutes to 3 hours, drying at 90 to 140° C. for 3 to 10 h, and calcination at 450 to 600° C. for 3 to 10 h;
    characterized in that, in step 3, the step of gradually increasing the concentration of the noble metal impregnation solution is dropping a noble metal impregnation solution having a concentration higher than that of the noble metal impregnation solution at a low concentration into the noble metal impregnation solution at a low concentration at a constant speed during the impregnation process.

2. The method according to claim 1, characterized in that the amorphous porous material is selected from one or more of $Al_2O_3$, $SiO_2$, $Al_2O_3$—$SiO_2$, $TiO_2$, $Al_2O_3$—$TiO_2$, $ZrO_2$, and $Al_2O_3$—$ZrO_2$.

3. The method according to claim 1, characterized in that the noble metal is selected from one or two of Pt, Pd, Ru, and Re compounds, and the mass fraction of the noble metal contained in the catalyst is 0.1 to 1.0 wt %.

4. The method according to claim 3, characterized in that, in step 3, the mass fraction of the noble metal in the prepared hydrogenation catalyst is 0.2 to 0.6 wt %.

5. The method according to claim 1, characterized in that, in step 3, the concentration of the noble metal component in the prepared catalyst particle increases from the center of the particle to the outer surface thereof, the ratio of the metal content at the circumcenter of the particle to the metal content on the circumcircle surface of the particle is 0.1 to 0.6, and the ratio of the metal content at 0.5 R to the metal content on the outer surface is 0.4 to 0.8, where the circumradius is R with the circumcenter of the cross section of the catalyst particle taken as the starting point.

6. A noble metal hydrogenation catalyst prepared by the method for preparing a noble metal hydrogenation catalyst according to claim 1, characterized in that the concentration of the noble metal component in the noble metal hydrogenation catalyst increases from the center of the particle to the outer surface thereof, the ratio of the metal content at the circumcenter of the particle to the metal content on the circumcircle surface of the particle is 0.1 to 0.6, and the ratio of the metal content at 0.5 R to the metal content on the outer surface is 0.4 to 0.8, where the circumradius is R with the circumcenter of the cross section of the catalyst particle taken as the starting point.

7. The noble metal hydrogenation catalyst according to claim 6, characterized in that the noble metal is selected from one or two of Pt, Pd, Ru, and Re compounds, and the mass fraction of the noble metal contained in the catalyst is 0.05 to 2.0 wt %.

8. The noble metal hydrogenation catalyst according to claim 7, characterized in that the mass fraction of the noble metal contained in the catalyst is 0.1 to 1.0 wt %.

9. The noble metal hydrogenation catalyst according to claim 8, characterized in that the mass fraction of the noble metal contained in the catalyst is 0.2 to 0.6 wt %.

10. A method for preparing lubricant base oil by using the noble metal hydrogenation catalyst prepared by the method according to claim 1 as a catalyst, characterized in that a waxy hydrocarbon raw material is contacted with the noble metal hydrogenation catalyst on a catalyst bed under a hydrogen atmosphere and a product flows outward to obtain a lubricant base oil.

11. The method for preparing lubricant base oil according to claim 10, characterized in that the waxy hydrocarbon raw material is selected from hydrocracked tail oil having a boiling point higher than 350° C., or hydrogenated vacuum gas oil, or slack wax, or ointment.

12. The method for preparing lubricant base oil according to claim 11, characterized in that the waxy hydrocarbon raw material has a sulfur content of no more than 100 µg/g and a nitrogen content of no more than 100 µg/g.

13. The method for preparing lubricant base oil according to claim 12, characterized in that the waxy hydrocarbon raw material has a sulfur content of no more than 50 µg/g and a nitrogen content of no more than 50 µg/g.

* * * * *